(12) United States Patent
Tanba et al.

(10) Patent No.: US 8,242,370 B2
(45) Date of Patent: Aug. 14, 2012

(54) DEVICE-CABLE ASSEMBLY INTEGRALLY MOLDED WITH RESIN

(75) Inventors: Akihiro Tanba, Hitachinaka (JP); Keiichi Ohuchi, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 280 days.

(21) Appl. No.: 12/775,509

(22) Filed: May 7, 2010

(65) Prior Publication Data
US 2011/0067919 A1    Mar. 24, 2011

(30) Foreign Application Priority Data

Sep. 24, 2009   (JP) .................................. 2009-219632
Mar. 5, 2010    (JP) .................................. 2010-048789

(51) Int. Cl.
*H01B 7/00*    (2006.01)
(52) U.S. Cl. .................................................. 174/120 R
(58) Field of Classification Search .............. 174/120 R, 174/120 SR; 385/100, 101
See application file for complete search history.

(56) References Cited

U.S. PATENT DOCUMENTS 6,072,928 A * 6/2000 Ruffa ............................ 385/100
7,085,457 B2 * 8/2006 Lancaster et al. ............. 385/101

FOREIGN PATENT DOCUMENTS

| JP | 2003-238710 | 8/2003 |
| JP | 3557194 | 5/2004 |
| JP | 2005-172687 | 6/2005 |
| JP | 4050787 | 12/2007 |
| WO | WO 2007/015498 A1 | 2/2007 |

* cited by examiner

*Primary Examiner* — Chau Nguyen
(74) *Attorney, Agent, or Firm* — Antonelli, Terry, Stout & Kraus, LLP.

(57) ABSTRACT

A device-cable assembly integrally molded with a resin according to the present invention comprises: the electric/electronic device; the cable including: a cable sheath which is the outermost layer of the cable, the cable sheath being made of a mixture of a fluorocarbon-based polymer and a polyolefin-based copolymer, and fine silica particles that are deposited on the surface of the cable sheath by CCVD (combustion chemical vapor deposition); and the molded resin which integrally covers the electric/electronic device and the cable together, the molded resin being made of a polyamide-based resin.

6 Claims, 3 Drawing Sheets

DEVICE-CABLE ASSEMBLY INTEGRALLY MOLDED WITH RESIN

CLAIM OF PRIORITY

The present application claims priority from Japanese patent application Ser. No. 2010-048789 filed on Mar. 5, 2010, which further claims priority from Japanese patent application Ser. No. 2009-219632 filed on Sep. 24, 2009, the content of which are hereby incorporated by reference into this application.

BACKGROUND OF THE INVENTION

1. Field of the Invention

The present invention relates to highly fluid-tight device-cable assemblies in which an electric/electronic device and a cable are integrally molded with a resin.

2. Description of Related Art

In order to prevent failure of an electric/electronic device due to the infiltration of moisture or other fluids, device-cable assemblies are widely used in which an electric/electronic device (such as a sensor, a circuit board, and a terminal) and a cable (to which the electric/electronic device is connected) are integrally molded with a resin. For example, an ABS (anti-lock brake system) sensor for vehicle use includes: a sensor for detecting the rotation rate of the vehicle's wheel; and a cable for transmitting signals from the ABS sensor. Such an ABS sensor is mounted near a vehicle's wheel, and is therefore required to withstand harsh conditions such as deposition of water or ice and a wide temperature range from −40° C. to 150° C. In view of these circumstances, in order to achieve higher fluid-tightness, sensor-cable assemblies in which a sensor and a cable are integrally molded with a resin are employed (see, e.g., JP-A 2005-172687).

Cables for use in such ABS sensor-cable assemblies need to be flexible and thermally resistant. So, the sheaths of such cables are often made of a fluorocarbon-based polymer or a modified fluorocarbon-based polymer, which is thermally resistant up to 200° C. and is also flexible. In addition, in such ABS sensor-cable assemblies, in order to prevent moisture from infiltrating into the sensor, the fluid-tightness between the cable and the molded resin needs to be sufficiently high.

However, when a fluorocarbon-based polymer or a modified fluorocarbon-based polymer is used as the cable sheath material, it is often difficult to achieve a sufficiently high fluid-tightness between the cable of such a sensor-cable assembly (which is integrally covered with a molded resin) and the molded resin. The general explanation for this difficulty is as follows: Generally, fluorine atoms and carbon atoms strongly bind together, and therefore the surfaces of fluorocarbon-based polymers are nonadherent (i.e., it is often difficult for other materials to adhere to the surfaces of fluorocarbon-based polymers). Furthermore, fluorocarbon-based polymers do not or are not sufficiently molten even at a temperature as high as the molding temperature of the resin.

In order to solve the above problem and facilitate adherence, printing or painting to fluorocarbon-based polymers, there are proposed methods for modifying the surface of a fluorocarbon-based polymer by blowing, toward the surface, a flame of a fuel gas containing a modifying compound (see, e.g., JP-B 3557194 and JP-B 4050787). For the purpose of covering cables, various resins for molding are used. However, it is not ensured that all of such various molded resins adhere well to the surface of a cable modified by the above-mentioned surface modifying treatment.

SUMMARY OF THE INVENTION

After an intensive study, the inventors have devised a structure that improves the adhesiveness between a cable and a molded resin. It is an objective of the present invention to provide a device-cable assembly integrally molded with a resin, which provides excellent adhesiveness between the cable's sheath made of a fluorocarbon-based polymer and the molded resin.

(1) According to one aspect of the present invention, there is provided a device-cable assembly in which an electric/electronic device and a cable are integrally molded with a resin, the device-cable assembly including:
the electric/electronic device;
the cable including:
a cable sheath that is the outermost layer of the cable, the cable sheath being made of a mixture of a fluorocarbon-based polymer and a polyolefin-based copolymer, and
fine silica particles which are deposited on the surface of the cable sheath by CCVD (combustion chemical vapor deposition); and
the molded resin that integrally covers the electric/electronic device and the cable together, the molded resin being made of a polyamide-based resin.

(2) According to another aspect of the present invention, there is provided a device-cable assembly in which an electric/electronic device and a cable are integrally molded with a resin, the device-cable assembly including:
the electric/electronic device;
the cable including:
a cable sheath that is the outermost layer of the cable, the cable sheath being made of a mixture of a fluorocarbon-based polymer and a polyolefin-based copolymer, the surface of the cable sheath being treated by atmospheric pressure plasma processing; and
the molded resin that integrally covers the electric/electronic device and the cable together, the molded resin being made of a polyamide-based resin.

In the above aspects (1) and (2) of the present invention, the following modifications and changes can be made.

(i) The fluorocarbon-based polymer is tetrafluoroethylene; and the polyolefin-based copolymer is a polypropylene-based copolymer or an ethylene-based copolymer.

(ii) The polyamide-based resin is a polyamide 612 (PA612, Nylon612) or a polyphthalamide (PPA).

ADVANTAGES OF THE INVENTION

The device-cable assembly integrally covered with molded resin according to the present invention has the advantage of providing excellent adhesiveness between the cable and the molded resin.

DETAILED DESCRIPTION OF THE PREFERRED EMBODIMENTS

A preferred embodiment of the present invention will be described below with reference to the accompanied drawings. However, the present invention is not limited to the embodiment described herein.

Figure 1:
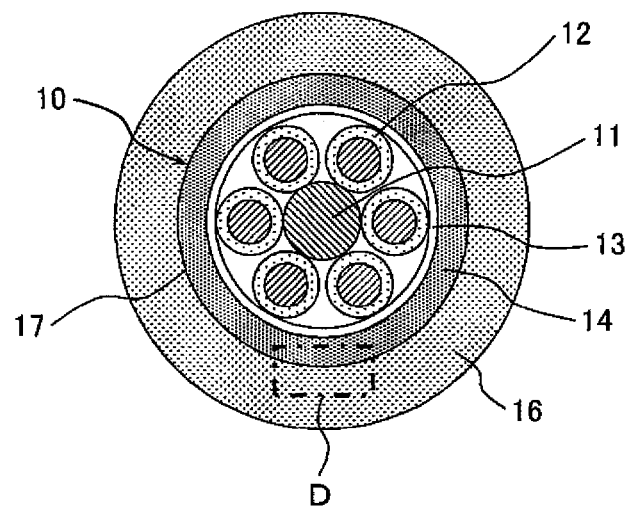
FIG. 1 is a schematic illustration showing a cross-sectional view of an example of a device-cable assembly integrally molded with a resin according to the present invention.

FIG. 1 is a schematic illustration showing a cross-sectional view of an example of a device-cable assembly integrally molded with a resin according to the present invention. This example is a motor rotational position sensor for vehicle-use, which includes a detector for the magnetic pole position of the motor and a cable 10 for transmitting signals therefrom. FIG. 1 particularly illustrates a cross-sectional view of a connecting portion of the sensor and the cable 10, in which the outer wall of the cable 10 is adherently covered with the molded resin 16. As illustrated in FIG. 1, the cable 10 includes: a center wire 11; multiple core wires 12 spirally wound around the center wire 11; a binder tape 13 surrounding entirely the core wires 12; and a cable sheath 14 (the outermost layer of the cable 10) formed around the binder tape 13.

Figure 2:
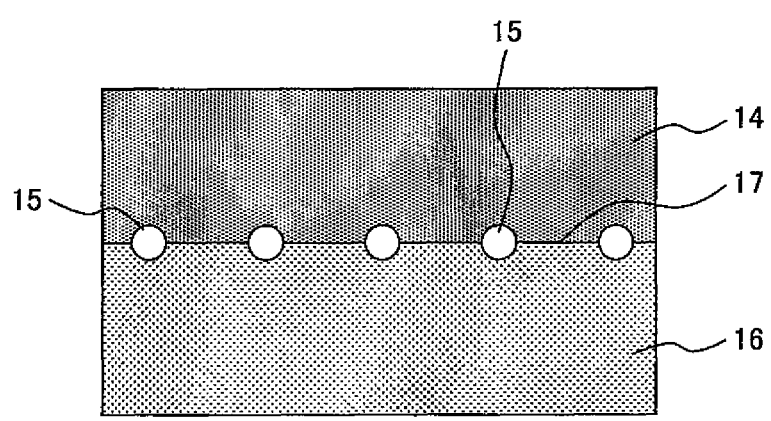
FIG. 2 is a schematic illustration showing an enlarged view of a principal portion within the rectangle D in FIG. 1.

FIG. 2 is a schematic illustration showing an enlarged view of a principal portion within the rectangle D in FIG. 1. As illustrated in FIG. 2, fine silica particles 15 made of silicon oxide are deposited on the surface of the cable sheath 14 of the cable 10 (i.e., formed between the cable sheath 14 and the molded resin 16) by CCVD (combustion chemical vapor deposition) method. The cable 10 having therearound the fine silica particles 15 and the ABS sensor are then integrally covered with the molded resin 16. In this manner, a highly fluid-tight device-cable assembly integrally covered with molded resin can be formed.

In the present invention, the cable sheath 14 of the cable 10 is made of a mixture of a fluorocarbon-based polymer (such as tetrafluoroethylene) and a polyolefin-based copolymer. The cable sheath 14 of the cable 10 is formed by extruding this sheath material around the binder tape 13 using an extruder. Furthermore, a polyamide-based resin is preferably used for the molded resin 16.

The polyolefin-based copolymer used is a polypropylene-based copolymer (such as polypropylene) or an ethylene-based copolymer (such as polyethylene). The cable sheath material is prepared by mixing 5 to 20 parts by weight of such a polyolefin-based copolymer and 100 parts by weight of a fluorocarbon-based polymer.

The use of, as the cable sheath material, a mixture of a fluorocarbon-based polymer and a polyolefin-based copolymer enables the fine silica particles 15 to bond relatively strongly with the cable sheath 14 (the fine silica particles 15 mainly bond with the polyolefin-based copolymer). The polyamide-based resin is preferably a polyamide 612 (PA612, Nylon612) or a polyphthalamide (PPA) resin.

The CCVD flame causes the polyolefin-based copolymer molecules present at the surface of the cable sheath 14 to have a polar group typified by an epoxy group. In addition, the fine silica particles 15 enhance the wettability of the molded resin 16 to the cable sheath 14, thus improving the adhesiveness of the interface 17 between a layer of the molded resin 16 and a layer of the cable sheath 14 and as a result ensuring the fluid-tightness between these two layers.

Besides, exemplary conditions of the CCVD method are as follows: CCVD treatment rate of 500 cm/s; distance of 20 mm between a head of the equipment and a work; work temperature from 60 to 100° C.; and CCVD treatment frequency of four times. Herein, the CCVD treatment rate is defined as a moving rate of the CCVD flame along the surface of the cable sheath 14; the above distance between a head of the equipment and a work is defined as a distance between a nozzle for the CCVD flame and the surface of the cable sheath 14; and the work temperature is defined as a temperature at the surface of the cable sheath 14.

In the example illustrated in FIGS. 1 and 2, the fine silica particles 15 are deposited on the outer surface of the cable sheath 14 by the CCVD method. Alternatively, the outer surface of the cable sheath 14 may be subjected to atmospheric pressure plasma processing and then the molded resin 16 may be formed around the cable sheath 14.

This atmospheric pressure plasma processing involves exciting nitrogen containing some oxygen into a plasma state by means of discharge from an electrode and exposing the outer surface of the cable sheath 14 to the nitrogen plasma. Such plasma processing causes the polyolefin-based copolymer molecules present at the surface of the cable sheath 14 to have an ethylene group or an epoxy group, and in addition the nitrogen plasma aminates the polyolefin-based copolymer. As a result, the adhesiveness between the cable sheath 14 and the molded polyamide-based resin 16 can be improved.

Besides, exemplary conditions of the atmospheric pressure plasma processing are as follows: plasma treatment rate of 10 cm/min; distance of 3 mm between a head of the equipment and a work; work temperature from 60 to 100° C.; and plasma treatment frequency of once. Herein, the plasma treatment rate is defined as a moving rate of the electrode along the surface of the cable sheath 14; the above distance between a head of the equipment and a work is defined as a distance between the electrode and the surface of the cable sheath 14; and the work temperature is defined as a temperature at the surface of the cable sheath 14.

Examples

Next, Examples of the present invention and Comparative examples will be described by referring to FIGS. 3 to 6.

Figure 3:
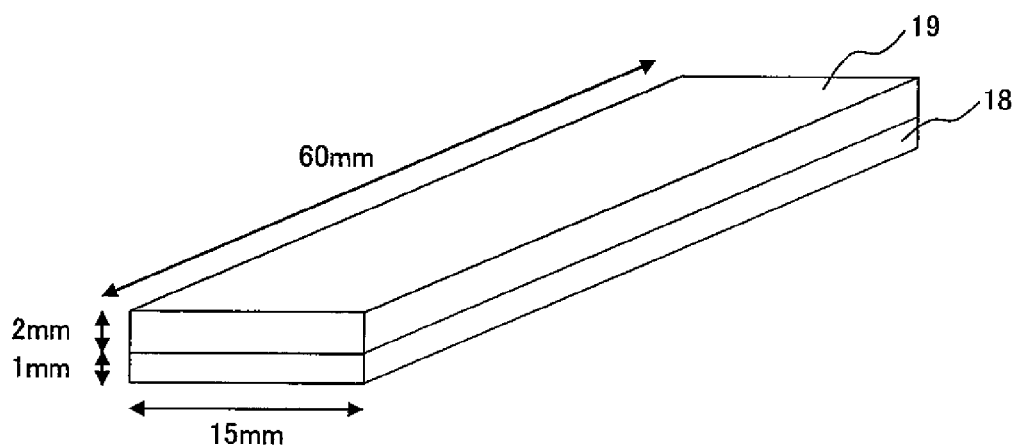
FIG. 3 is a schematic illustration showing a perspective view of a specimen for a peel strength measurement in the present invention.

First, a peel strength measurement for the present invention will be explained. The peel strength indicates a degree of adhesiveness between two members bonded together and is a forth per unit width to peel them away. FIG. 3 is a schematic illustration showing a perspective view of a specimen for a peel strength measurement in the present invention. As shown in FIG. 3, on a sheet 18 made of the material of the cable sheath 14 having a thickness of 1 mm, a width of 15 mm and a length of 60 mm, a resin sheet 19 made of the material of the molded resin 16 is formed by injection molding so that the resin sheet 19 has a thickness of 2 mm, a width of 15 mm and a length of 60 mm.

Figure 4:
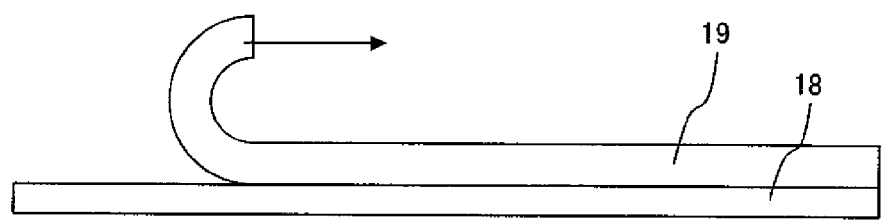
FIG. 4 is a schematic illustration explaining a peel strength measurement.

FIG. 4 is a schematic illustration explaining a peel strength measurement. As shown in FIG. 4, the peel strength measurement was conducted by peeling the resin sheet 19 as the molded resin 16 from the sheet 18 as the cable sheath 14 in a longitudinal 180-degree direction indicated by an arrow (so-called a 180-degree peel method) at a peel rate of 50 mm/min.

Figure 5:
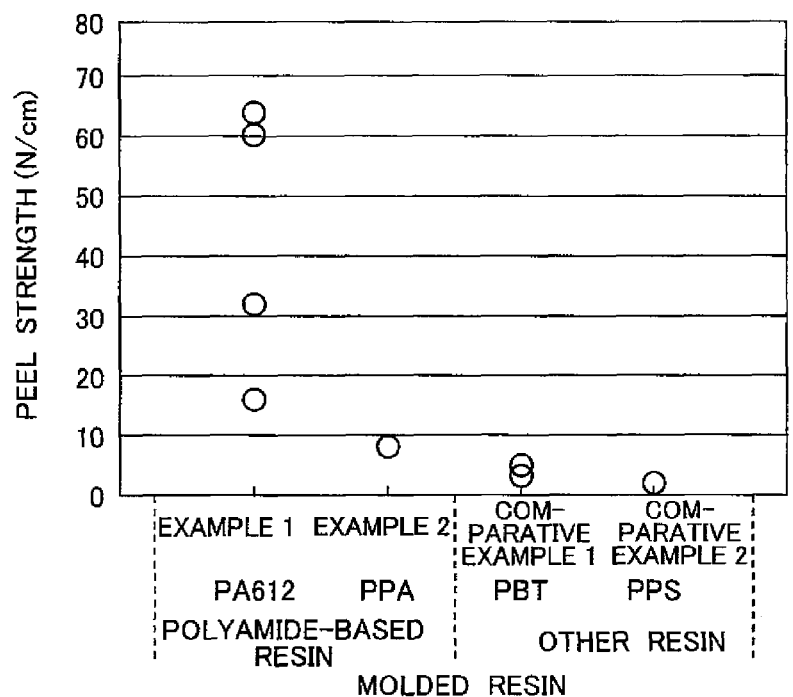
FIG. 5 is a graph showing the measurement results of peel strength between the cable sheath and the molded resin for Examples of the present invention and Comparative examples, in which a cable with fine silica particles on its surface is covered with various molded resins.

FIG. 5 is a graph showing the measurement results of peel strength between the cable sheath and the molded resin for Examples of the present invention and Comparative examples, in which a cable with fine silica particles on its surface is covered with various molded resins. In FIG. 5, Examples 1 and 2 of the present invention were prepared as follows: the cables 10 as described in FIGS. 1 and 2 (which had the fine silica particles on its surface) were respectively covered with PA612 and PPA of a kind of polyamide-based resins. Comparative examples 1 and 2 were prepared as follows: the cables 10 that were prepared similarly to Examples were covered with polybutylene terephthalate (PBT) resin and polyphenylene sulfide (PPS) resin, respectively.

As can be seen from FIG. 5, Examples 1 and 2 of the present invention (which were molded with a polyamide-based resin) exhibited excellent peel strengths (more than 9 N/cm) compared to Comparative examples 1 and 2.

Figure 6:
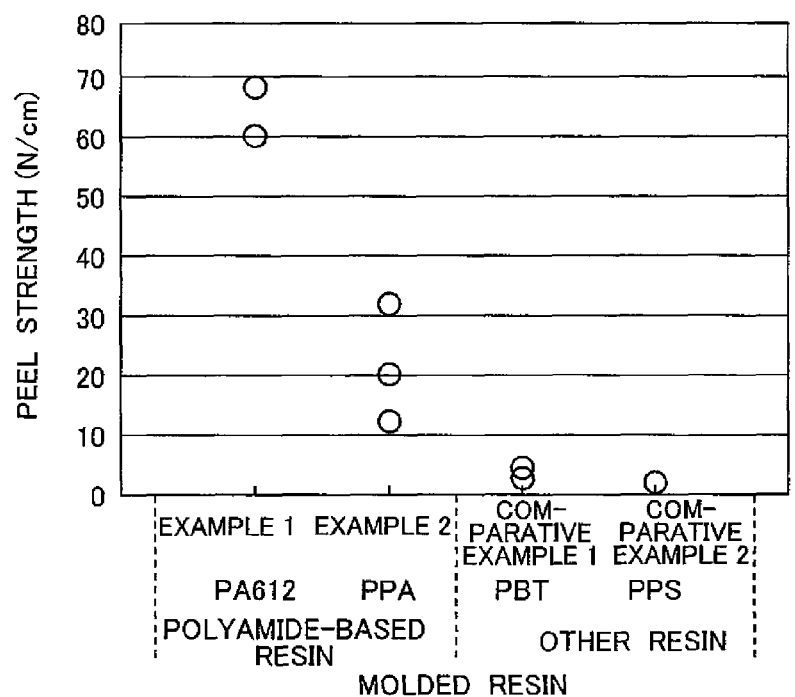
FIG. 6 is a graph showing the measurement results of peel strength between the cable sheath and the molded resin for Examples of the present invention and Comparative examples, in which a cable whose surface is treated by atmospheric pressure plasma processing is covered with various molded resins.

On the other hand, FIG. 6 is a graph showing the measurement results of peel strength between the cable sheath and the molded resin for Examples of the present invention and Comparative examples, in which a cable whose surface is treated by atmospheric pressure plasma processing is covered with various molded resins. In FIG. 6, Examples 3 and 4 of the present invention were prepared as follows: the cables 10 without the fine silica particles were subjected to the above-described atmospheric pressure plasma processing and then were respectively covered with PA612 and PPA of a kind of polyamide-based resins. Comparative examples 3 and 4 were prepared as follows: the cables 10 that were prepared similarly to Examples were covered with polybutylene terephthalate (PBT) resin and polyphenylene sulfide (PPS) resin, respectively.

As can be seen from FIG. 6, Examples 3 and 4 of the present invention (which were covered with the molded polyamide-based resin) exhibited excellent peel strengths compared to Comparative examples 3 and 4. In addition, comparing Examples 2 and 4 (which were molded with PPA), Example 4 (that was subjected to the atmospheric pressure plasma processing) had greater peel strengths (10 N/cm or more) than Example 2 (for which the fine silica particles were deposited on the cable sheath). This is probably because the increased bonding strength provided by the functional groups generated by the nitrogen plasma is greater than the surface activation effect provided by the fine silica particles formed by CCVD.

On the contrary, Comparative examples 1 to 4 molded with PBT or PPS exhibited poorer peel strength (and therefore poorer adhesiveness), as shown in FIGS. 5 and 6. This is probably because the molded PBT and PPS have a poorer polarity, thereby causing a poorer affinity and a poorer bonding strength with both the fluorocarbon-based polymer and the polyolefin-based copolymer contained in the cable sheath.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A device-cable assembly in which an electric/electronic device and a cable are integrally molded with a resin, the device-cable assembly comprising:
   the electric/electronic device;
   the cable including:
   a cable sheath that is the outermost layer of the cable, the cable sheath being made of a mixture of a fluorocarbon-based polymer and a polyolefin-based copolymer, and
   fine silica particles which are deposited on the surface of the cable sheath by CCVD (combustion chemical vapor deposition); and
   the molded resin that integrally covers the electric/electronic device and the cable together, the molded resin being made of a polyamide-based resin.

2. The device-cable assembly according to claim 1, wherein the fluorocarbon-based polymer is tetrafluoroethylene; and the polyolefin-based copolymer is a polypropylene-based copolymer or an ethylene-based copolymer.

3. The device-cable assembly according to claim 1, wherein the polyamide-based resin is a polyamide 612 (PA612, Nylon612) or a polyphthalamide (PPA).

4. A device-cable assembly in which an electric/electronic device and a cable are integrally molded with a resin, the device-cable assembly comprising:
   the electric/electronic device;
   the cable including:
   a cable sheath that is the outermost layer of the cable, the cable sheath being made of a mixture of a fluorocarbon-based polymer and a polyolefin-based copolymer, the surface of the cable sheath being treated by atmospheric pressure plasma processing; and
   the molded resin that integrally covers the electric/electronic device and the cable together, the molded resin being made of a polyamide-based resin.

5. The device-cable assembly according to claim 4, wherein the fluorocarbon-based polymer is tetrafluoroethylene; and the polyolefin-based copolymer is a polypropylene-based copolymer or an ethylene-based copolymer.

6. The device-cable assembly according to claim 4, wherein the polyamide-based resin is a polyamide 612 (PA612, Nylon612) or a polyphthalamide (PPA).

* * * * *